United States Patent [19]

Obara

[11] Patent Number: 4,970,363
[45] Date of Patent: Nov. 13, 1990

[54] METHOD OF AND APPARATUS FOR DETECTING WORKING CONDITIONS FOR A WIRE ELECTRIC DISCHARGE MACHINE

[75] Inventor: Haruki Obara, Toyama, Japan

[73] Assignee: Fanuc, Minamitsuru, Japan

[21] Appl. No.: 360,881

[22] PCT Filed: Nov. 15, 1988

[86] PCT No.: PCT/JP88/01153

§ 371 Date: May 4, 1989

§ 102(e) Date: May 4, 1989

[87] PCT Pub. No.: WO89/04738

PCT Pub. Date: Jun. 1, 1989

[30] Foreign Application Priority Data

Nov. 16, 1987 [JP] Japan .................................. 62-287246

[51] Int. Cl.$^5$ .......................... B23H 1/02; B23H 7/02; B23H 7/20
[52] U.S. Cl. .............................. 219/69.12; 219/69.17; 364/474.04
[58] Field of Search .............. 219/69.12, 69.13, 69.16, 219/69.17; 364/474.04, 474.15, 474.16

[56] References Cited

U.S. PATENT DOCUMENTS 4,510,367  4/1985  Obara ................................. 219/69.12
4,559,434  12/1985  Kinoshita ........................ 219/69.17
4,863,579  9/1989  Asaoka .............................. 219/69.13

FOREIGN PATENT DOCUMENTS 25722  2/1986  Japan ................................. 219/69.13
131205  6/1988  Japan .............................. 364/474.04

Primary Examiner—A. D. Pellinen
Assistant Examiner—Geoffrey S. Evans
Attorney, Agent, or Firm—Staas & Halsey

[57] ABSTRACT

A working-condition detecting method for a wire electric discharge machine and an apparatus therefor are provided, for positively and experimentally determining a working condition for optimum and most efficient wire electric discharge machining. Test machining is carried out while gradually increasing off-time of a transistor of a discharge power source of the machine every predetermined working section. Unfulfillment of a linear relationship between an average working electric current and a working speed is determined when a ratio of an increment of the working speed with respect to that of the average working electric current between the preceding and present working sections becomes smaller than a value, equal to the product of a coefficient and an average value of the ratios in the entire working sections until this time and smaller than the average value. The off-time at this time is identified as the working condition which is used to carry out actual machining.

19 Claims, 3 Drawing Sheets

METHOD OF AND APPARATUS FOR DETECTING WORKING CONDITIONS FOR A WIRE ELECTRIC DISCHARGE MACHINE

BACKGROUND OF THE INVENTION a. Field of the Invention

The present invention relates to detection of an optimum working condition for wire electric discharge machining.

b. Description of the Related Art

In wire electric discharge machining, there are five-hundred to six-hundred working conditions such as material and thickness of a workpiece, material and diameter of a wire electrode, jetting pressure of working fluid from a nozzle, and distance between the nozzle and the workpiece, and further, as electric conditions, no-load voltage, condenser capacity in the case of capacitor discharge, charge on-pulse width, charge current, off-time duration, working speed and so on. Thus, it is extremely difficult to set the working conditions one by one. Moreover, conventionally, the setting of these conditions is generally made relying upon experience and perception of an operator. Hence, this method is encumbered with difficulties in setting optimum and most efficient working conditions, and in ascertaining whether or not the working conditions thus set are optimum ones. After all, trial-and-error is required in setting the working conditions.

To eliminate the drawback of the above mentioned working-condition setting by the operator, the following methods are known, for instance. In a first method (refer to Japanese Patent Application Laid-Open No. Sho 59-7523), among various sets of electric working conditions, which are stored beforehand in a control device in a manner corresponding to thicknesses of workpieces, a set of conditions are selected in dependence on the workpiece thickness determined on the basis of working electric current and working speed, to obtain working conditions suitable for the thus determined workpiece thickness. In another method (refer to Japanese Patent Application Laid-Open No. Sho 54-13096), electric working conditions and working speeds, corresponding to thicknesses of workpieces, are stored in a control device, and the electric working conditions are changed in accordance with the working speed. In still another method (refer to Japanese Patent Application Laid-Open No. Sho 49-108696), respective numbers for which good and bad electric discharge occur are counted, and electric working conditions are changed in dependence upon the ratio of these counts.

However, changing the working conditions in dependence upon the workpiece thickness, as disclosed in the above Japanese Patent Application Laid-Open No. Sho 59-7523 and No. Sho 54-13096, has a problem in that the electric working conditions cannot be changed in accordance with changes in factors other than the workpiece thickness such as the jetting pressure of the working fluid from the nozzle and the distance between the nozzle and the workpiece, despite that the electric working conditions should be changed with changes in these factors.

Further, according to the method disclosed in the above Japanese Patent Application Laid-Open No. Sho 49-108696, the working conditions can vary during machining, despite that the working conditions should not be varied, but should be kept unchanged, if the workpiece thickness remains constant, because such variations during wire cut electric discharge machining may result in the workpiece being scratched on its surface. After all, this conventional method has a drawback in that it is unable to carry out efficient wire cut electric discharge machining.

SUMMARY OF THE INVENTION

It is an object of the present invention to provide a detecting method of and an apparatus for detecting an optimum working condition in wire electric discharge machining.

In order to achieve the above-mentioned object, a working-condition detecting method of the present invention comprises steps of: (a) carrying out test machining while changing a working condition associated with working power every predetermined working section in such a manner that the working power increases gradually; (b) detecting an average working electric current and a working speed in each of the predetermined working sections; and (c) detecting, as an optimum working condition, the working condition at the time a linear relationship is not fulfilled between the average working electric current and the working speed.

According to the present invention, a working-condition detecting apparatus for use in a wire electric discharge machine of a servo feed type comprises: a working-condition alteration circuit for changing a working condition associated with working power each time test machining is carried out over a corresponding one of the predetermined working sections, in such a manner that the working power increases gradually; a first detection means for detecting an average working electric current in each of the predetermined working sections; a second detection circuit for detecting a working speed in each of the predetermined working sections; a first calculation circuit for calculating a proportional coefficient between the average working electric current and the working speed on the basis of the average working currents and the working speeds in the preceding and present predetermined working sections detected by the first and second detection circuits; a memory unit for storing the average working currents, the working speeds and the proportional coefficients detected and calculated respectively in the predetermined working sections; a second calculation circuit for calculating an average value of the thus stored proportional coefficients; and a discrimination circuit for detecting, as an optimum working conditions, the working condition at the time it is judged that a linear relationship is not fulfilled between the average working electric current and the working speed on the basis of a comparison result between the thus calculated average value and the proportional coefficient calculated in the present predetermined working section.

As described above, according to the present invention, since the test machining is carried out while altering the working condition every predetermined working section, with the working power increasing gradually, and the working condition at the time the linear relationship is not fulfilled between the average working currents and the working speeds are detected as the optimum working condition, the working condition for optimum and most efficient wire electric discharge machining can be positively and experimentally obtained.

DESCRIPTION OF THE PREFERRED EMBODIMENT

Figure 1:
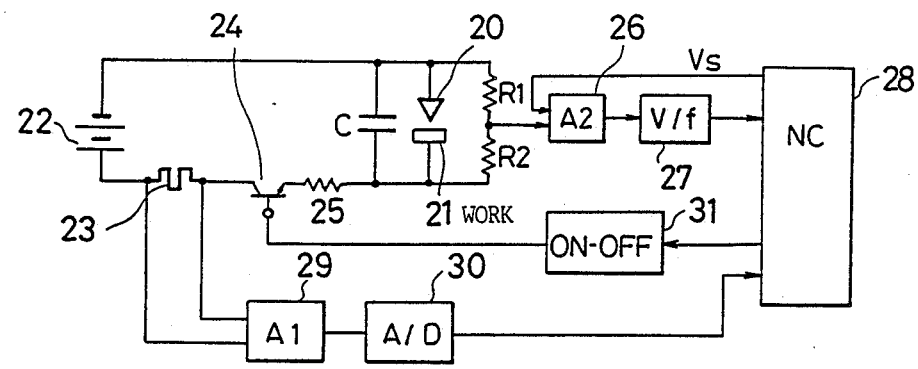
FIG. 1 is a block diagram showing a working-condition detecting apparatus according to an embodiment of the present invention.

Referring to FIG. 1, a wire electric discharge machine comprises a transistor-controlled capacitor-discharge type power source. Specifically, a capacitor C19 is connected in parallel with a wire electrode 20 and a workpiece 21, and is charged by a direct-current power source 22 through an electric shunt 23, a transistor 24 serving as a switching element, and a current limit resistor 25, so that the charge voltage is applied to a gap between the wire 20 and the workpiece 21. A first differential smoothing amplifier 26 is supplied at one input terminal with a voltage obtained by dividing the gap voltage by resistors R1, R2, and supplies a voltage-to-frequency converter (hereinafter referred to as "V/f converter") 27 with the differential voltage between the divided voltage and a servo voltage Vs output from a numerical control unit (hereinafter referred to as "NC") 28. The NC 28 serves to perform a so-called servo feed control wherein, in response to the output from the V/f converter 27, the NC 28 drives a servomotor (mentioned later), which in turn drives a table (not shown) on which the workpiece 21 is fixedly mounted, to control a working speed F so as to keep the gap voltage constant.

Further, a working electric current detected by the electric shunt 23 is smoothed by a second differential smoothing amplifier 29 which delivers an analog signal representative of an average working electric current I to an A/D converter 30. This analog signal is converted by the A/D converter 30 into a digital signal to be applied to the NC 28. Reference numeral 31 denotes an ON-OFF circuit for generating pulses for turning a transistor 24 on and off.

Figure 2:
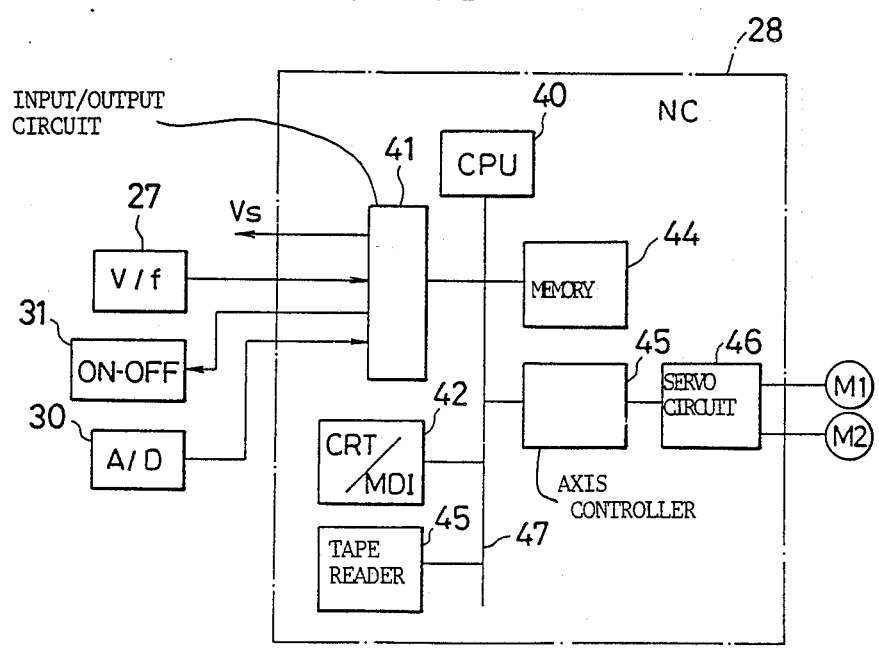
FIG. 2 is a block diagram showing an internal arrangement of a numerical control unit of FIG. 1, and peripheral elements thereof.

FIG. 2 is a block diagram of a principal portion of the NC 28. Connected to a central processing unit 40 through a bus 47 are an input/output circuit 41, a manual data input unit with CRT display (hereinafter referred to as "CRT/MDI") 42, a tape reader 43, a memory 44 and an axis controller 45 including an interpolator. The memory 44 is composed of a ROM storing therein a control program, a nonvolatile RAM for storing a machining program and various setting values and for temporary data storage, and other elements. The central processing unit 40 receives respective output signals from the V/f converter 27 and the A/D converter 30 through the input/output circuit 41, for on-off-control of the ON-OFF circuit 31. Further, connected to the axis controller 45 is a servo circuit 46 for servomotors M1, M2 for driving the table on which the workpiece 21 rests.

With the arrangement described above, the machining program is inputted from an NC tape through the tape reader 43, or the machining program is created and inputted through the CRT/MDI 42. The machining program is then stored in the memory 44, to thereby complete the usual preparation for electric discharge machining. Subsequently, test machining is carried out before actual working, to determine a working condition. For this purpose, the material and diameter of the wire electrode 20, the jetting pressure from a nozzle, and so on are set, and an initial working condition for attaining small working power are set by the CRT/MDI 42 as electric working conditions. These are stored in the memory 44. The test machining is first started.

Figure 3:
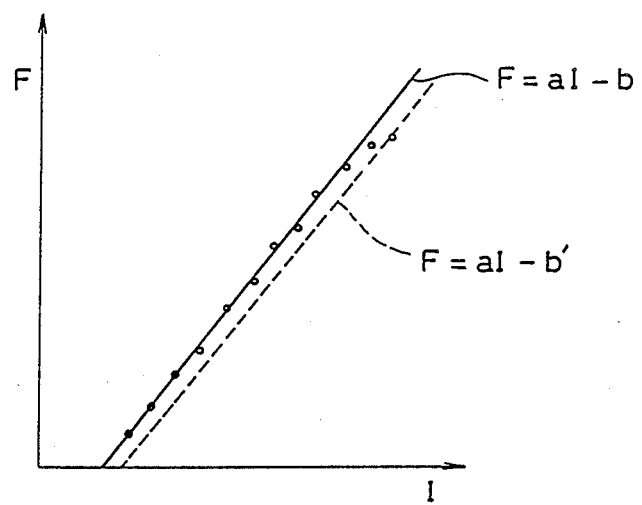
FIG. 3 is a graph for explanation of the working-condition detecting principle of the present invention.

Here, the principle of determination of the working condition through the medium of test machining will be described. In wire electric discharge machining, the average working electric current and the working speed increase with an increase in the working power. As shown in FIG. 3, when the working power is small, a linear relationship indicated by a straight line and represented by the following equation is fulfilled between the average working current I and the working speed F.

$$F = a \cdot I - b \quad (1)$$

(where a is a coefficient, and b is a constant)

As the working power increases so that the working power approaches a value resulting in wire breakage, the working speed F does not increase in proportion to an increase in the average working current I even if the current I increases, so that the linear relationship is no longer fulfilled.

Figure 4:
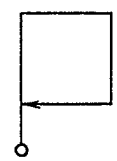
FIG. 4 is a diagram illustrating of a working locus of test machining executed for detecting a working condition.

In view of the above, prior to the actual machining, test machining having a machining locus as shown in, for example, FIG. 4 is carried out while gradually increasing the working power, each time machining is effected over a predetermined distance (predetermined working section). During this test machining, the relationship between the average working current I and the working speed F is monitored. Then, the working condition, corresponding to the working power at the time there occurs a deviation from an allowable limit line (indicated by the broken line in FIG. 3), represented by the below-mentioned equation (2) and obtained by parallel shift of the straight line represented by the equation (1) by a predetermined distance, so that the linear relationship is no longer fulfilled, that is, when the following equation (3) is fulfilled, is determined as an upper-limit or optimum working condition.

$$F = aI - b' \quad (2)$$

$$F \leq aI - b' \quad (3)$$

As will be clear from the equation (1) and FIG. 3, an increment dF/dI of the working speed F with respect to that of the average working current I represents a proportional coefficient a for small working power. When the working power increases to a value large enough to render the linear relationship unfulfilled, the increment dF/dI becomes smaller than the proportional coefficient a. Accordingly, it is possible to judge when the linear relationship is no longer fulfilled by determining when the increment dF/dI reaches a predetermined amount, for example, a value equal to or less than $\alpha \cdot a$ ($0 < \alpha < 1$).

Figure 5:
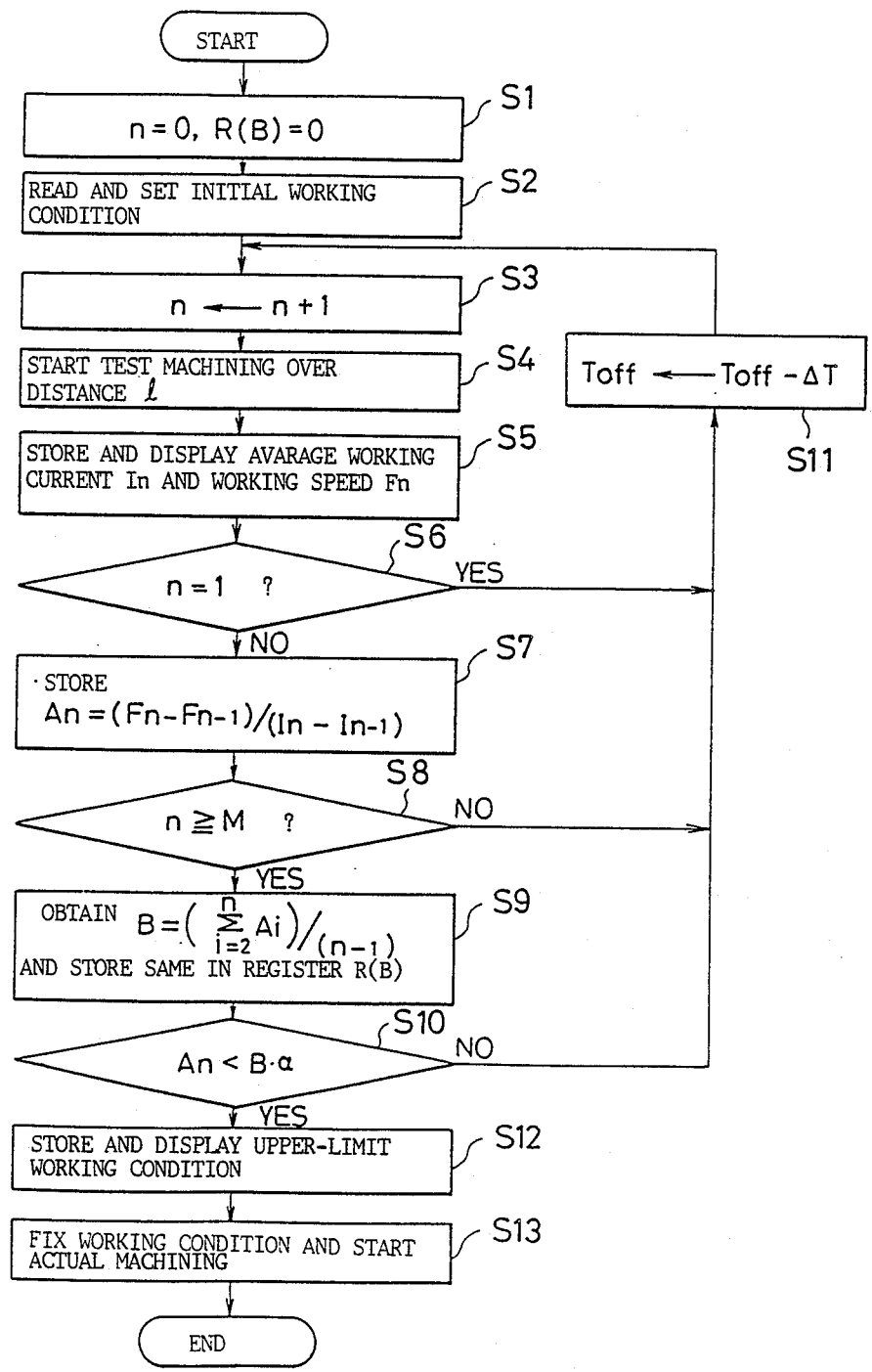
FIG. 5 is a flow chart of working-condition detection processing executed by the apparatus of FIG. 1.

With reference to FIG. 5, the working-condition detecting processing executed by the wire electric discharge machine of FIGS. 1 and 2 will be described.

Let it be supposed that the working power is increased decreasing a length of off-time Toff at which the transistor 24 is in an OFF-state.

In the test machining, first, the CPU 40 sets an index n and a register R(B) to "0", respectively (step S1). An initial working condition set beforehand is read from the memory 44, to be set as a working condition (step S2). Subsequently, the index n is increased by "1" (step S3), to start the test machining over a predetermined working distance (predetermined working section) 1 set beforehand (step S4). The NC 28 causes the ON-OFF circuit 31 to generate pulse outputs of on-time and off-time in accordance with the initial working condition, to turn on and off the transistor 24. When the transistor 24 is turned on, the capacitor C is charged by the direct-current power source 22 through the electric shunt 23, the transistor 24 and the current limit resistor 25. The charged voltage is applied to a gap between the wire electrode 20 and the workpiece 21. Thus, electric discharge occurs between the wire electrode 20 and the workpiece 21 so that the electric discharge machining is carried out.

The gap voltage between the wire electrode 20 and the workpiece 21 is divided and is inputted to the differential smoothing amplifier 26, to be compared with servo voltage Vs. Output pulses having a frequency as a function of a difference between both the voltages are supplied from the V/f converter 27 to the NC unit 28. At the beginning of the start-up of the test machining which is composed of a series of working sections, since the off-time of the transistor 24 is long, the working power is kept small. Thus, the voltage output from the differential smoothing amplifier 26 is low, and the output frequency from the V/f converter 27 is low. As a result, the feed rate of the table or the workpiece is low, and the working speed F is low. Further, the current passing through the electric shunt 23, that is, the working current is smoothed by the differential smoothing amplifier 29, and is detected as the average working current I, to be supplied to the NC 28 through the A/D converter 30.

When the test machining over the predetermined distance 1 has been completed, the CPU 40 of the NC 28 reads out the respective outputs from the V/f converter 27 and the A/D converter 30, that is, the working speed F and the average working current I. The read-out outputs are stored in the memory 44 as the nth (=1) average working current In (=I1) and working speed Fn (=F1) (step S5). The relationship between the average working current In and the working speed Fn is graphically displayed on the CRT screen of the CRT/MDI 42 (step S5). Then, it is judged whether or not the index n is "1" (step S6). Since the index n is "1" at the beginning, the program proceeds to a step S11 where the ON-OFF circuit 31 is operated, with the off-time decreased by a predetermined amount ΔToff. Whereupon the processings of the steps S3 through S6 are again executed.

If it is judged at the step S6 that the index n is not "1" (here, n=2), the program proceeds to the step S7. At this step, in order to obtain a rate of change An (=A2) between the preceding and present detections, a value, which is obtained by subtracting the working speed Fn−1 (=F1), previously detected and stored in the memory 44, from the working speed Fn (=F2) detected this time, is divided by a value, which is obtained by subtracting the preceding average working current In-1 (=I1) from the average working current In (=I2) detected this time.

$$An = (Fn - Fn-1)/(In - In-1) \quad (4)$$

$$A2 = (F2 - F1)/(I2 - I1) \quad (5)$$

That is, the rate of change An in the equation (4) represents an increment dFn/dIn of the working current Fn with respect to that of the average working current In, and corresponds to the proportional coefficient a in the equation (1). The thus obtained An (=dFn/dIn=a) is stored in the memory 44. Next in step S8, it is judged whether or not the index n reaches a value equal to or higher than a predetermined value M set beforehand. If the index n does not reach the predetermined value M, the program proceeds to a step S11. At this step, a shorter off-time Toff is set, which is obtained by further subtracting a predetermined amount ΔToff from the present off-time Toff. The processings of the steps S3 through S8 are again repeated.

In the above manner, the off-time Toff is shortened to increase the working power each time the test machining over the predetermined distance 1 has been completed. Subsequently, the test machining is carried out successively. The average working current In and the working speed Fn in every test machining are obtained and stored, and the relationship between the average working currents In and the working speeds Fn is graphically displayed on the CRT screen. As a result, the relationship between the average working currents In and the working speeds Fn is displayed on the CRT screen as shown in FIG. 3.

Thus, when it is determined at the step S8 that the value of the index n reaches the set value M, in accordance with the following equation (6), the average B of the rates of change An stored in the memory 44 is calculated (step S9).

$$B = \left( \sum_{i=2}^{n} Ai \right) / (n - 1) \quad (6)$$

A value B·α, which is obtained by multiplying the allowable limit coefficient α (0<α<1) by the thus obtained average rate of change B (equal to the value of the coefficient a in the equation (1)) is compared with the rate of change An last obtained (step S10). If the rate of change An is larger than the value B·α, it is judged that the rate of change An is within an allowable range, and the off-time is shortened by a predetermined amount at a step S11. Subsequently, the processings at the steps S3 through S10 are again executed. On the other hand, if the rate of change An is smaller than the value B·α, it is indicated that the rate of change exceeds the allowable limit, that is, the linear relationship between the average working current In and the working speed Fn is no longer fulfilled. Accordingly, the off-time Toff (working condition) at this time is stored as an upper-limit working condition, and is displayed on the CRT screen (step S12). Assuming, for example, that the above allowable limit coefficient α is 0.9, when the rate of change An (=dFn/dIn) reaches a value equal to or less than 0.9·B, or when an increase in the working speed Fn with respect to that in the average working current In reaches a value equal to or less than 90% of the average value B, it is judged that the linear relationship is no longer fulfilled.

Whereupon, the actual machining is started under this upper-limit working condition (step S13). Meanwhile, depending upon the magnitude of the setting value of the aforesaid allowable limit coefficient α, the optimum working condition may be obtained by adding ΔToff to the off-time Toff detected as the upper limit working condition in the working section followed by the working section in which unfulfillment of the linear relationship is determined.

In the above embodiment, the average rate of change B is obtained when the index n reaches the setting value M at the step S8, that is, after a Mth decrease in the off-time or an Mth increase in the working power has been executed. However, the average rate of change B may be obtained by dividing the sum of all the rates of change An obtained until that time by the number of additions (n−1) of the rates of change An each time the rate of change An is obtained, with the processing at the step S8 omitted.

Further, the average rate of change B, that is, the value of the proportional coefficient a in the equation (1) may be obtained only at a stage in which the working power is low. In this case, the step S9 is arranged to include a process of raising a flag, which indicates the process of storing the average rate of change B at the step S9 being completed, and, between the steps S8 and S9, an additional step is provided, wherein a judgment is made as to whether or not the flag is raised, and the program proceeds to the step S9 if the judgment result is negative, whereas the program proceeds to step S10 if the result is affirmative.

Moreover, in the above embodiment, the off-time Toff of the transistor 24 is decreased gradually in order to increase the working power. However, the on-time may be increased successively. Alternatively, a value of the current limit resistor 25 may be varied to successively increase the supplied electric current.

Furthermore, in case where the transistor-discharge power source is employed, either one of the on-time and the off-time of the transistor may be varied to successively increase the working power.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

I claim:

1. A working-condition detecting method for detecting an optimum working condition of a wire electric discharge machine, said method comprising steps of:
   (a) carrying out test machining while changing a working condition associated with a working power every predetermined working section in a manner to increase the working power gradually;
   (b) detecting an average working electric current and a working speed for each of the predetermined working sections; and
   (c) detecting, as the optimum working condition, the working condition when a linear relationship is no longer fulfilled between the average working electric current and the working speed.

2. A working-condition detecting method according to claim 1, wherein the wire electric discharge machine is a servo feed type machine having servomotors for moving a workpiece and a wire electrode relatively to each other.

3. A working-condition detecting method according to claim 1, wherein the wire electric discharge machine includes a transistor-discharge type power source having a switching transistor, and
   wherein during said test machining in step (a) at least one of an on-time and off-time of the switching transistor of the transistor-discharge power source is changed.

4. A working-condition detecting method according to claim 1, wherein the wire electric discharge machine includes a transistor-controlled capacitor-discharge type power source having a switching transistor, and
   wherein during said test machining in step (a) at least one of an on-time, an off-time and a supplied electric current of the switching transistor of the transistor-controlled capacitor-discharge power source is changed.

5. A working-condition detecting method according to claim 2, wherein the wire electric discharge machine includes a transistor-discharge type power source having a switching transistor, and
   wherein during said test machining in step (a) at least one of an on-time and off-time of the switching transistor of the transistor-discharge power source is changed.

6. A working-condition detecting method according to claim 2, wherein the wire electric discharge machine includes a transistor-controlled capacitor-discharge type power source having a switching transistor, and
   wherein during said test machining in step (a) at least one of an on-time, an off-time and a supplied electric current of the switching transistor of the transistor-controlled capacitor-discharge power source is changed.

7. A working-condition detecting apparatus for detecting an optimum working condition for use in a wire electric discharge machine, comprising:
   working-condition alteration means for changing a working condition associated with a working power each time test machining is carried out over a corresponding one of a plurality of predetermined sections to increase the working power gradually;
   first detection means for detecting an average working electric current for each of the predetermined working sections;
   second detection means for detecting a working speed for each of the predetermined working sections;
   first calculation means for calculating a proportional coefficient between the average working electric current and the working speed on the basis of the average working electric currents and the working speeds in preceding and current predetermined working sections detected by said first and second detection means;
   memory means for storing the average working electric currents, the working speeds and the proportional coefficients detected and calculated respectively for the predetermined working sections;

second calculation means for calculating an average value of the proportional coefficients; and discrimination means for detecting, as the optimum working condition, the working condition when it is determined that a linear relationship is not fulfilled between the average working electric current and the working speed based on comparing the average value and the proportional coefficient calculated in the current predetermined working section.

8. A working-condition detecting apparatus according to claim 5, wherein the wire electric discharge machine includes a transistor-controlled capacitor-discharge type power source, and wherein said working condition alternation means operates to change at least one of an on-time, an off-time and a supplied electric current of the switching transistor of said transistor-controlled capacitor-discharge power source.

9. A working-condition detecting apparatus according to claim 5, wherein said apparatus further comprises a display device, and wherein the average working electric current and the working speed detected respectively by said first and second detection means are graphically displayed by the display device.

10. A working-condition detecting apparatus according to claim 7, wherein the wire electric discharge machine is a servo feed type machine having a servomotor for moving a workpiece and a wire electrode relatively to each other.

11. A working-condition detecting apparatus according to claim 7, wherein the wire electric discharge machine includes a transistor-discharge type power source having a switching transistor, and wherein said working condition alteration means operates to change at least one of an on-time and off-time of the switching transistor of said transistor-discharge power source.

12. A working-condition detecting apparatus according to claim 10, wherein the wire electric discharge machine includes a transistor-discharge type power source having a switching transistor, and wherein said working condition alteration means operates to change at least one of an on-time and off-time of the switching transistor of said transistor-discharge power source.

13. A working-condition detecting apparatus according to claim 10, wherein the wire electric discharge machine includes a transistor-controlled capacitor-discharge type power source, and wherein said working condition alternation means operates to change at least one of an on-time, an off-time and a supplied electric current of the switching transistor of said transistor-controlled capacitor-discharge power source.

14. A working-condition detecting apparatus according to claim 10, wherein said apparatus further comprises a display device, and wherein the average working electric current and the working speed detected respectively by said first and second detection means are graphically displayed by the display device.

15. A method for detecting a working condition associated with an electric power of a wire electric discharge machine as an optimum working condition, said method comprising the steps of:

(a) initially setting the working condition to correspond to a low electric power;

(b) test machining over a predetermined working distance using the working condition;

(c) determining an average working current and a working speed corresponding to said test machining in step (b);

(d) calculating a rate of change of the average working current and the working speed;

(e) comparing a present rate of change calculated in step (d) with a previous rate of change; and (f) selecting the working condition to be the optimum working condition based upon said comparing in step (e) when the previous rate of change exceeds the present rate of change by a predetermined amount.

16. A method according to claim 15, wherein the electric discharge machine is for machining a workpiece, and wherein said method further comprises the step of (g) machining the workpiece using the electric power associated with the optimum working condition.

17. A method according to claim 15, wherein said method further comprises the steps of:

(g) resetting the working condition to correspond to an increase in the electric power when the previous rate of change does not exceed the present rate of change by the predetermined amount; and (h) repeating steps (b) through (g) until the optimum working condition is detected.

18. A method according to claim 17, wherein said comparing in step (e) includes the steps of:

(e1) averaging the rate of changes calculated in step (d) to produce an average rate of change; and (e2) comparing the present rate of change with the average rate of change, and wherein said selecting in step (f) selects the working condition to be the optimum working condition based upon said comparing when the average rate of change exceeds the present rate of change by the predetermined amount.

19. A method according to claim 18, wherein the electric discharge machine is for machining a workpiece, and wherein said method further comprises the step of (i) machining the workpiece using the electric power associated with the optimum working condition.

* * * * *